US006007905A

United States Patent [19]

Kudo et al.

[11] Patent Number: 6,007,905

[45] Date of Patent: Dec. 28, 1999

[54] WAVE ABSORBER AND METHOD FOR PRODUCTION THEREOF

[75] Inventors: Toshio Kudo, Osaka; Hideaki Tamura, Kawasaki, both of Japan

[73] Assignee: Mitsubishi Cable Industries, Ltd., Amagasaki, Japan

[21] Appl. No.: 08/899,802

[22] Filed: Jul. 24, 1997

[30] Foreign Application Priority Data

Jul. 24, 1996 [JP] Japan .................................... 8-214350

[51] Int. Cl.[6] .............................. B32B 3/18; H01Q 17/00

[52] U.S. Cl. ........................... 428/313.5; 264/126; 342/1; 342/4; 428/316.6; 428/317.5; 428/319.1; 428/407

[58] Field of Search .............................. 428/313.5, 316.6, 428/317.5, 403, 407, 319.1; 342/1, 4; 264/125, 126

[56] References Cited

U.S. PATENT DOCUMENTS

| | | | |
|---|---|---|---|
| 2,865,800 | 12/1958 | Stastny | 428/313.5 X |
| 3,978,268 | 8/1976 | Kameda et al. | 428/368 |
| 4,496,627 | 1/1985 | Azuma et al. | 428/336 |
| 4,751,249 | 6/1988 | Wycech | 521/54 |
| 4,952,935 | 8/1990 | Sawa et al. | 342/4 |
| 5,073,444 | 12/1991 | Shanelec | 428/313.5 |
| 5,373,296 | 12/1994 | Ishno et al. | 342/4 |

FOREIGN PATENT DOCUMENTS

| | | |
|---|---|---|
| 04144197 | 5/1992 | Japan . |
| 05055778 | 3/1993 | Japan . |
| 05291782 | 11/1993 | Japan . |

*Primary Examiner*—Blaine Copenheaver
*Attorney, Agent, or Firm*—Leydig, Voit & Mayer, Ltd.

[57] ABSTRACT

A wave absorber comprising first foamed particles comprising foamed particles of a thermoplastic organic polymer and a conductive layer formed on the surface thereof, and second foamed particles comprising foamed particles of a thermoplastic organic polymer, the first foamed particles and the second foamed particles being melt-adhered to each other, and a method for producing same. The wave absorber of the present invention is superior in a long-term shape retention, and shows superior wave absorption performance, thereby rendering itself suitable for use in an anechoic chamber.

12 Claims, 3 Drawing Sheets

WAVE ABSORBER AND METHOD FOR PRODUCTION THEREOF

TECHNICAL FIELD OF THE INVENTION

The present invention relates to a wave absorber. More particularly, the present invention relates to a wave absorber which serves well for use in an anechoic chamber.

BACKGROUND OF THE INVENTION

A wave absorber for an anechoic chamber, specifically for an antenna pattern measurement, is required to have higher (e.g., about 30–40 dB) wave absorption performance than ordinary wave absorbers. Japanese Patent Unexamined Publication No. 4-144197/1992 proposes a wave absorber for use in an anechoic chamber, which is produced by preparing a material by adhering foamed organic polymer beads with one another using an adhesive, which particles having a surface layer made from a conductive material such as carbon black and graphite, and forming the material into a desired shape such as a quadratic pyramid, cone, wedge and the like.

Of the formed products proposed therein, particularly that having a quadratic pyramidal shape, which is known to achieve superior wave absorption performance, is associated with a problem that the vertex of the quadratic pyramid is decayed by a short-term use to result in drastic degradation of wave absorption performance.

According to the studies by the present inventors, the adhesion between foamed organic polymer beads in the formed product proposed in the above publication is achieved only by the adhesion of an extremely thin resin binder contained in the conductive layer, and said adhesion has been found to decrease during a short-term use of the wave absorber.

It is therefore an object of the present invention to provide a wave absorber superior in a long-term shape retention, which is made of foamed organic polymer particles having a conductive layer on the surface thereof, and a method of production thereof.

SUMMARY OF THE INVENTION

In a first aspect of the present invention, there is provided a wave absorber having a structure wherein first foamed particles comprising foamed particles of a thermoplastic organic polymer and a conductive layer formed on the surface thereof, and second foamed particles comprising foamed particles of a thermoplastic organic polymer, are melt-adhered to each other.

In a second aspect of the present invention, there is provided a method for producing a wave absorber, comprising heating, in a mold, a mixture of prefoamed beads of a thermoplastic organic polymer, having a conductive surface layer, and prefoamed beads of a thermoplastic organic polymer, without a conductive surface layer, for expansion molding.

DETAILED DESCRIPTION OF THE INVENTION

Figure 1:
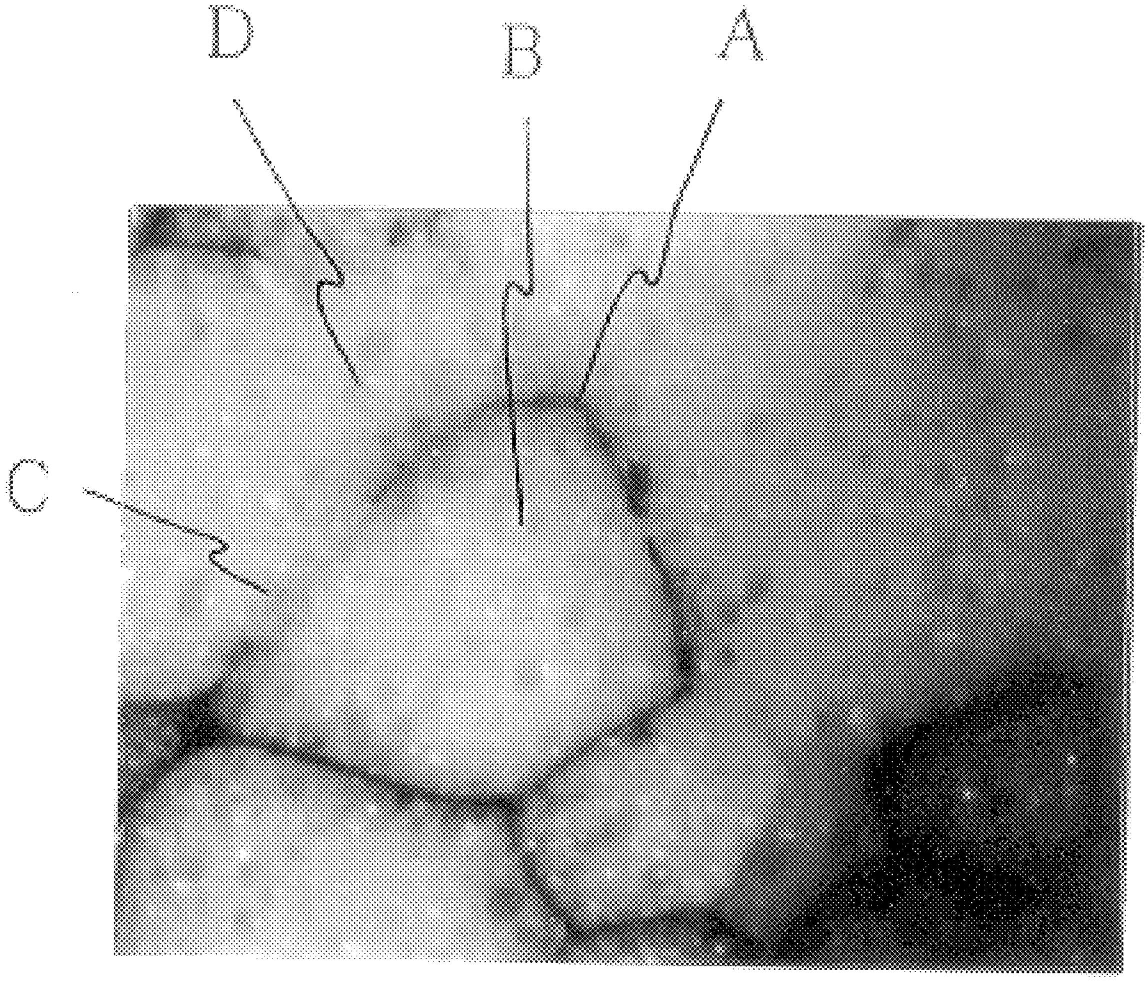
FIG. 1 is a microscopic photograph of a partial cross section of the inventive wave absorber of Example 1, showing a particle structure, wherein A shows a conductive layer, B shows the first foamed particle, C shows melt-adhesion between the first foamed particle and the second foamed particle, and D shows a deformed second foamed particle.

Being fundamentally different from the formed product of the above-mentioned Japanese Patent Unexamined Publication No. 4-144197/1992, wherein foamed beads are adhered with one another via a thin layer of a resin binder, the wave absorber of the present invention comprises first foamed particles and second foamed particles which have been extremely strongly adhered to each other by melt-bonding, so that, when prepared into a molding such as a quadratic pyramid and other forms, the wave absorber of the present invention can retain the original shape for a long time.

The wave absorber of the present invention can be easily produced by heating a mixture of first foamed particles and second foamed particles in, for example, a mold, to expansion mold same into a molding having a desired shape. The first foamed particles have a conductive surface layer and are capable of melt-adhering to the surface of second foamed particles as a result of various phenomena to be mentioned later. To be specific, the first foamed particles partly lose the conductive layer when they expand during the expansion molding process to gain greater volume. Alternatively, the first foamed particles suffer from partial deterioration of the conductive layer due to deformation of the foamed particles, even if the both foamed particles are free of an increase in volume. Then, the surface of the first foamed particles that partly lost the conductive layer and thus exposed, are melt-adhered to the surface of the second foamed particles. In a different case, due to a topical pressure produced by the second particles during expansion molding, the conductive layer of the first foamed particles partly comes off and is removed, or becomes extremely thin, so that the first and the second foamed particles are melt-adhered to each other at said region.

It is preferable for the production of the wave absorber of the present invention that, of the two foamed particles, at least the first foamed particles expand (i.e., gain volume) upon heating, as do the prefoamed beads to be mentioned later, to certainly create an exposed surface without the conductive layer, which ensures stable melt-adhesion to the second foamed particles. When the prefoamed beads are used as the material of the first foamed particles, a conductive layer is formed on the surface thereof by the method to be mentioned later.

The above-mentioned prefoamed beads are generally obtained by incompletely foaming, particularly at a low foaming ratio of about 5 to 10, foamable beads made from various non-foamed thermoplastic organic polymers or thermoplastic organic polymer compositions, and can further expand by heating. The foaming ratio is calculated by the formula:

(density of the organic polymer constituting a foam)×1000/(density of the foam), hereinafter the same).

The first foamed particles comprise foamed thermoplastic organic polymer particles and a conductive layer formed on the surface thereof. The fundamental function of said foamed particles of thermoplastic organic polymer is to carry the conductive layer present on its surface. In the present invention, moreover, foamed particles are adhered to each other as mentioned earlier. The organic polymer constituting said foamed particles may be any thermoplastic polymer as long as it can carry the conductive layer and melt-adhere to other foamed particles. From a practical viewpoint, moreover, those superior in flame retardance and weatherability can be also used. Inasmuch as said foamed particles to carry a conductive layer are required to have a dielectric constant which is as low as possible, those having superior foamability are preferred.

In generality, the organic polymer usable for forming the first foamed particles preferably has a dielectric constant (at room temperature, frequency 1 MHz or below, hereinafter the same) of not more than 3.0, particularly not more than 2.5, in a non-foamed state; and a flame-retardant organic polymer and an organic polymer composition containing a flame retardant preferably have a dielectric constant of not more than 3.5, particularly not more than 3.0, in a non-foamed state. The dielectric constant of the foamed body of the first foamed particles, namely, dielectric constant of the first foamed particles devoid of the conductive layer, is preferably 1.05–1.5, particularly 1.05–1.2, irrespective of whether or not the material constituting the particles has flame retardance.

The preferable thermoplastic organic polymer is exemplified by flame-retardant resins containing halogen, such as poly (vinyl chloride), vinylidene chloride resins, tetrafluoroethylene-perfluoroalkylvinyl ether copolymer and tetrafluoroethylene-ethylene copolymer; and flame-retardant resin compositions containing a flame retardant and a resin not containing halogen, such as polyolefins (e.g., polyethylene, polypropylene and poly-4-methylpentene-1), polystyrene, styrene-acrylonitrile copolymer and polyurethane. The flame retardance is preferably of the level expressed by an oxygen index of at least 25.

Of the recited thermoplastic organic polymers, polystyrene and vinylidene chloride resin, particularly vinylidene chloride resin, are specifically preferable in view of superior flame retardance, weatherability and foamability. Examples of vinylidene chloride resin include homopolymer of vinylidene chloride; copolymer of monomer, oligomer or polymer of vinylidene chloride, and at least one of other copolymerizable components such as vinyl chloride, various acrylic esters, acrylonitrile, and other components; and compositions mainly containing such homopolymer or copolymer.

While there is imposed no particular limitation on average particle size and expansion ratio of the foamed particles of the first foamed particles after melt adhesion to the second foamed particles, the expansion ratio is generally about 10–60, preferably about 20–40, and the average particle size is generally about 1–6 mm, preferably about 2–4 mm.

For production of the wave absorber of the present invention, various commercially available prefoamed beads can be used and additionally expanded during expansion molding to satisfy the above-mentioned expansion ratio.

The conductive surface layer of the first foamed particles is formed using a conductive powder such as carbon black, graphite and metal powder. The conductive powder is coated in a conventional amount per unit area of the foamed particles, such as 0.5–10$\mu$m, particularly about 1–5 $\mu$m, when expressed in average thickness of the conductive surface layer. The conductive surface layer can be formed by an optional method as long as the conductive powder layer having the noted thickness can be formed. For example, an oil or a tackiness agent is coated on the surface of the foamed particles in an extremely small amount to impart tackiness and the foamed particles thus treated and conductive powder are mixed to achieve tacky adhesion of the conductive powder to the surface of the foamed particles; or a conductive powder containing an extremely small amount of an oil or a tackiness agent and thus having tackiness is mixed with foamed particles to form a layer wherein the conductive powders have achieved tacky adhesion of one another; or a suitable resin binder is used in the place of the oil and tackiness agent.

Examples of the resin binder include ultraviolet curable resin coating, various low viscosity liquids curable by crosslinking, such as thermosetting enamel varnish, low viscosity liquid not curable by crosslinking, such as resin latex, and the like. When a low viscosity liquid curable by crosslinking is used, and when a solvent is contained, the surface of foamed particles is treated with the liquid, dried and then crosslinked. When such liquid without a solvent is used, a crosslinking treatment may be applied immediately after the surface treatment, or the surface treatment and the crosslinking treatment may be simultaneously applied. When a resin latex is used, the foamed particles only need be dried after surface treatment. The use of any resin binder results in, after drying or crosslinking treatment, foamed particles having a conductive powder bound by a resin and adhered to the surface thereof. The resin to be the main component of the resin binder coating may be, as mentioned earlier, a resin curable by crosslinking. In view of the easiness of melt adhesion to the second foamed particles to be mentioned later, a resin not curable by crosslinking, such as various thermoplastic organic polymers, particularly vinylidene chloride, is preferably used.

The second foamed particles enhance binding strength between the foamed particles by melt adhesion to the first foamed particles. Thus, various foamed thermoplastic organic polymer particles can be used as the second foamed particles, and the foregoing explanations with regard to the first foamed particles also apply here except the conductive surface layer. Various prefoamed beads themselves can be used as the second foamed particles.

The second foamed particles may be made from an organic polymer different from that constituting the foamed particles of the first foamed particles, as long as it can melt-adhere by normal heating. In general, melt adhesion by heating is easy when the same kind of organic polymer is used for the first and the second foamed particles. For example, when the material of the foamed particles of the first foamed particles is vinylidene chloride, the material of the second foamed particles is preferably also vinylidene chloride. Likewise, when the material of the foamed particles of the first foamed particles is polystyrene, the material of the second foamed particles is preferably also polystyrene.

The second foamed particles generally have the same range of particle size as that of the first foamed particles, though the size and size distribution thereof may differ as long as the size falls within the same range as noted above. The second foamed particles generally have about the same particle size with the first foamed particles before and after expansion molding during production.

When the second foamed particles are used in excess of the first foamed particles, wave absorption performance becomes degraded, whereas when they are used in an extremely small amount, the binding strength between foamed particles decreases. Thus, the second foamed particles are used in amounts of 1–100 parts by weight, particularly 5–50 parts by weight, and more particularly 10–40 parts by weight, per 100 parts by weight of the first foamed particles. When the second foamed particles are used in a proportion of 10–40 parts by weight per 100 parts by weight of the first foamed particles, wave absorption performance in a low frequency range of about several hundred MHz becomes additionally fine.

Generally speaking, greater areas of melt adhesion between the first foamed particles and the second foamed particles bring about greater mechanical strengths of the wave absorber of the present invention. On the contrary, however, it also leads to greater areas devoid of the conductive layer to result in less wave absorption performance. In the present invention, sufficient mechanical strength can be achieved even with small areas of melt adhesion between the both foamed particles, so that about 1–30%, particularly about 2–10%, of the average entire surface area of the first foamed particles is preferably melt-adhered to the second foamed particles.

The shape of the wave absorber of the present invention may be a combination of a base and a taper formed on said base, or other optional shape obtained by processing. The above-mentioned taper may be a pyramid, quadratic pyramid, cone, wedge or other protrusion. The inventive wave absorber can be combined with a low frequency wave absorber as necessary, such as various lattice type, panel type sintered ferrite tiles, to make a wave absorber exhibiting superior absorption performance in a wide band range of from a low frequency of about 30 MHz to a high frequency of about 10 GHz or above.

The wave absorber having quadratic pyramid or various other protrusions on the base, which is filled with a melt adhesion product of foamed particles, may suffer from poor thermal conductivity due to greater heat capacity and its being a foam, which in turn requires longer time for cooling after forming using a mold. This problem can be resolved by adopting the structure shown in Example 3, wherein the inside of the protrusion is void, which is conducive to a shortened cooling time and easy manufacture.

The present invention is described in more detail by way of Examples, which should not be construed as limiting the invention.

Example 1

Prefoamed beads (Cellmore, trademark, Asahi Chemical Industry Co., Ltd., average particle size 3 mm) made from vinylidene chloride copolymer were used as the second foamed particles. To the same prefoamed beads was added an aqueous conductive coating in an amount of 100 parts by weight per 100 parts by weight of the beads, and the mixture was thoroughly mixed. The mixture was dried at 100° C. to remove water in the conductive coating. The beads which adhered to other beads were mechanically separated to give the first foamed particles. As the above-mentioned aqueous conductive coating, used was a mixture of a graphite conductive coating (10 parts by weight, ED-188, trademark, Nippon Acheson) and vinylidene chloride copolymer latex (1 part by weight, Krehalon R14A, trademark, Kureha Chemical Industry Co., Ltd.)

The thus-obtained first foamed particles and the second foamed particles were uniformly mixed in a weight ratio (first foamed particles:second foamed particles) of 4:1, and the mixture was heated at 130° C. for 5 minutes in a mold to give a wave absorber having 16 quadratic pyramids (150 mm one bottom side, 200 mm height) formed on a square base (50 mm thick, 600 mm one side).

FIG. 1 is a microscopic photograph showing the particle structure in a partial cross section of said inventive wave absorber. In the figure, a thick line A shows the conductive layer on the first foamed particles, a part B shows the first foamed particle, and a part D present between first foamed particles shows a deformed second foamed particle. The foamed particles were adhered to each other at C where the conductive layer on the first foamed particle, i.e., the thick line A, ends.

Example 2

A lattice-type sintered ferrite tile absorber was adhered beneath the base of the wave absorber of Example 1 to give a wide band wave absorber.

Example 3

The 4:1 bead mixture used in Example 1 was again used to give a quadratic pyramid wave absorber having the same size and appearance with the absorber of Example 1, but empty inside of the base and quadratic pyramid. Therefore, the cross section thereof had four reversed V-shaped protrusions consecutively joined in line, wherein the wall of the reversed V-shaped protrusion had an average thickness of 50 mm.

Example 4

In the same manner as in Example 1 except that polystyrene prefoamed beads (Eslen Beads FDL, trademark, Sekisui Plastics Co., Ltd., average particle size 0.5–1.2 mm) were used instead of the prefoamed beads made from vinylidene chloride copolymer, and Varniphite L-30 (trademark, Nippon Graphite Ind.) as the graphite conductive coating, a wave absorber having 16 quadratic pyramids and the same size was obtained.

Example 5

A lattice-type sintered ferrite tile absorber was adhered beneath the base of the wave absorber of Example 4 to give a wide band wave absorber.

Example 6

The 4:1 bead mixture used in Example 4 was again used to give a quadratic pyramid wave absorber having the same size and appearance with the absorber of Example 4 but empty inside of the base and quadratic pyramid. Therefore, the cross section thereof had four reversed V-shaped protrusions consecutively joined in line wherein the reversed V-shaped protrusion had an average thickness of 50 mm.

The absorbers of Examples 1 and 4, 2 and 5 and 3 and 6 had the same appearance, but the prefoamed beads and conductive coating used were different. The wave absorption characteristic was about the same for all absorbers. The wave absorption characteristics of the absorbers of Examples 1, 2 and 3 are shown in FIGS. 2 and 3.

Figure 2:
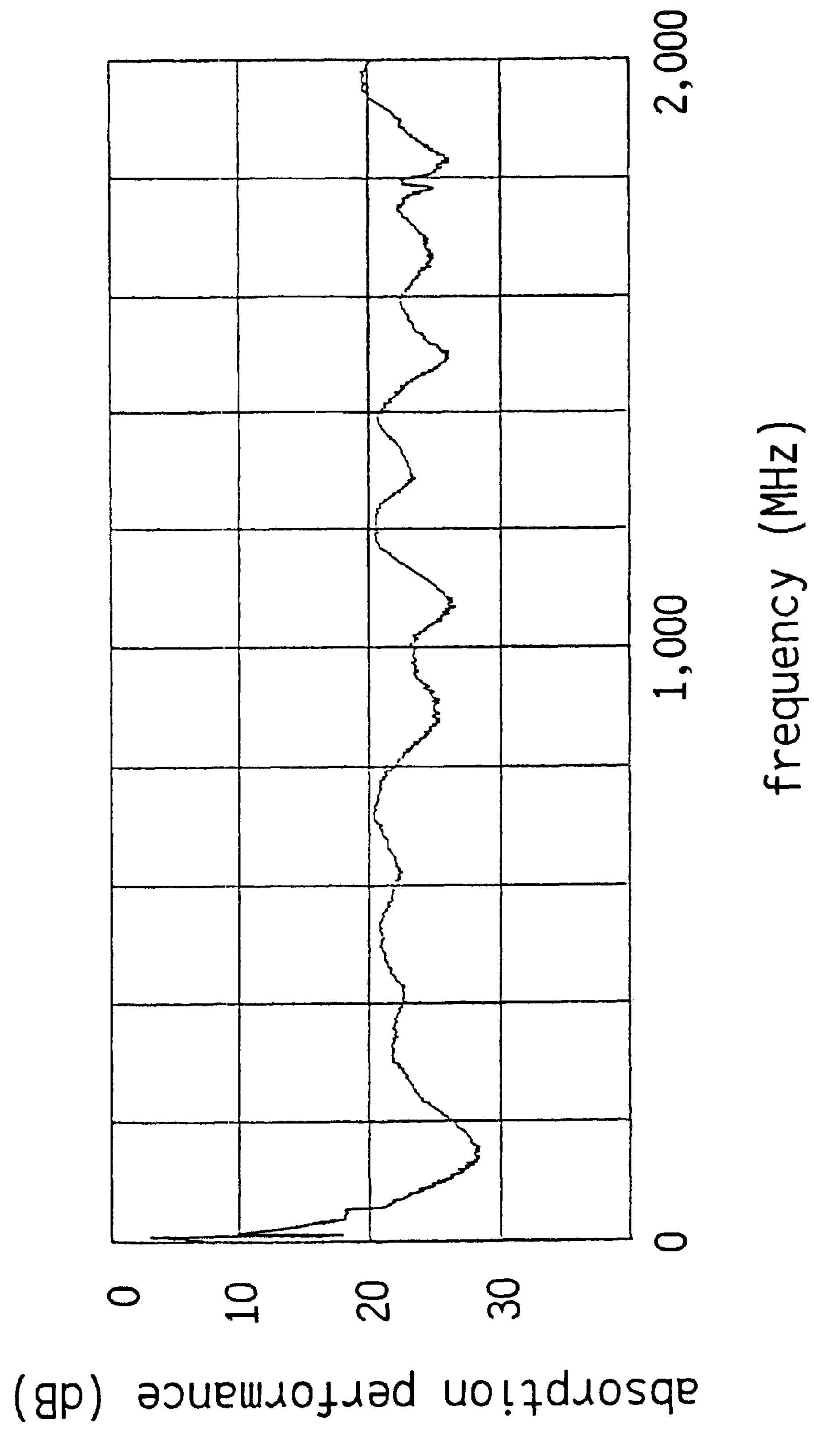
FIG. 2 shows absorption characteristic up to 2 GHz as measured by a WX-77D coaxial waveguide method with respect to the inventive wave absorber of Example 2.
Figure 3:
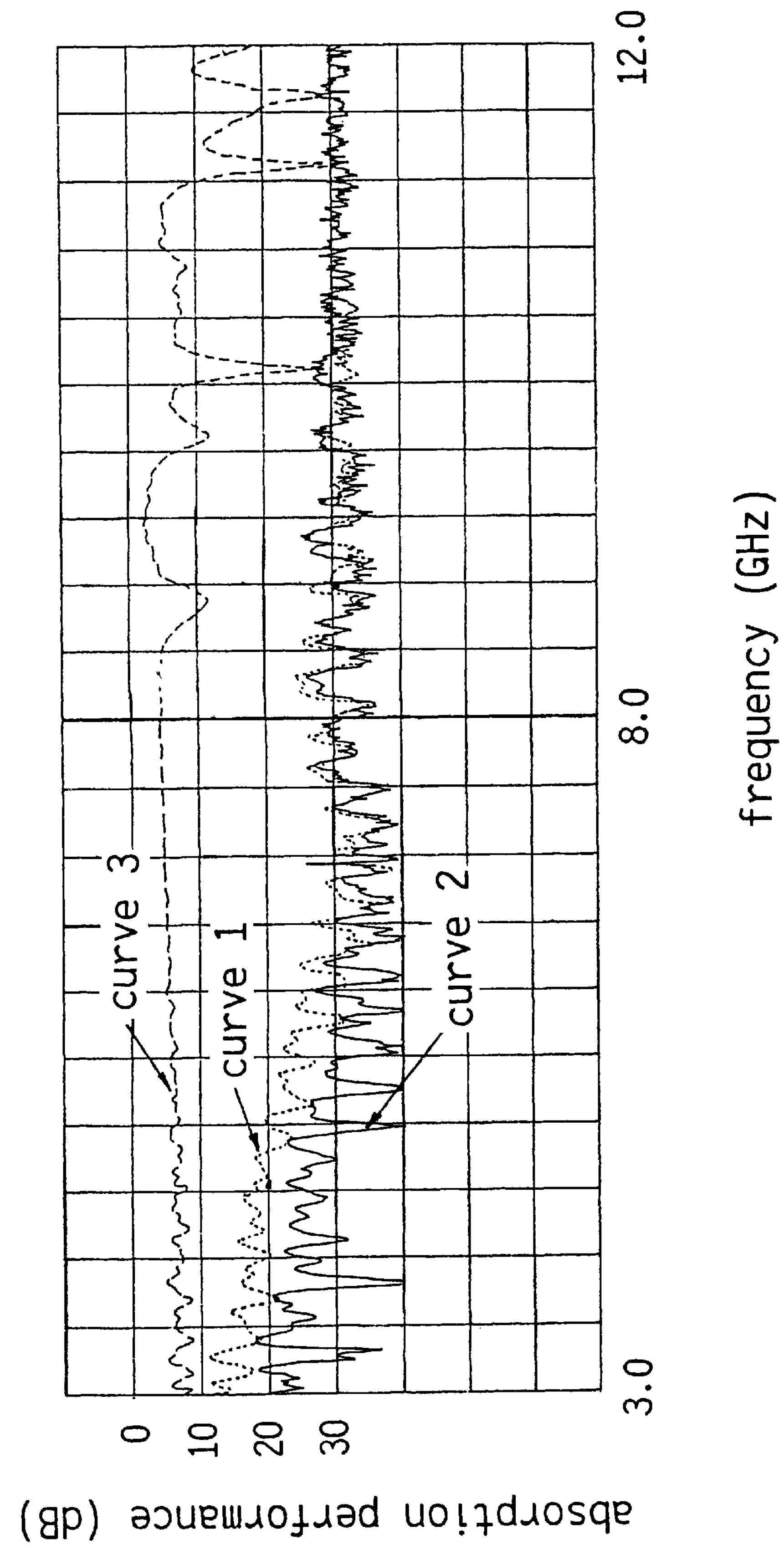
FIG. 3 shows absorption characteristic of each wave in the band of from 3 to 12 GHz as measured by the NRL arch method with respect to the inventive wave absorbers of Example 1 and Example 2 and an ordinary lattice-type sintered ferrite tile wave absorber.

FIG. 3 shows absorption characteristics as measured in the band of from 3 to 12 GHz, of the wave absorber of Example 1 (curve 1), wave absorber of Example 2 (curve 2) and lattice-type sintered ferrite tile absorber (curve 3) alone used in Example 2. FIG. 2 shows absorption characteristics of the wave absorber of Example 2 up to 2 GHz, as measured by the WX-77D coaxial waveguide method.

From FIGS. 2 and 3, it is evident that the wave absorbers of Examples 1 and 2 had superior absorption characteristics in a wide band range bridging a low frequency of about 30 MHz and a high frequency of not less than 10 GHz.

The wave absorber prepared by adhering a lattice-type sintered ferrite tile absorber beneath the base of the wave absorber of Example 3 showed superior absorption characteristic in a wide band range, like the wave absorber of Example 2.

The wave absorber of the present invention can retain the initial shape for a long time after production, be it quadratic pyramid or other molding, since part or most of the foamed particles is melt-adhered to one another. The presence of conductive layer in the interface between foamed particles affords superior wave absorption characteristic, and when combined with a ferrite tile absorber, for example, the wave absorber of the present invention shows superior absorption characteristic in a wide band range bridging a low frequency of about 30 MHz and a high frequency of not less than 10 GHz. As such, the wave absorber of the present invention is suitable as a wave absorber for use in an anechoic chamber.

This application is based on application No. 214350/1996 filed in Japan, the content of which is incorporated hereinto by reference.

What is claimed is:

1. A combination wave absorber comprising (a) a wave absorber comprising (i) first foamed particles comprising foamed particles of a thermoplastic organic polymer and a conductive layer formed on the surface thereof, and (ii) second foamed particles without a conductive surface layer comprising foamed particles of a thermoplastic organic polymer, the first foamed particles and the second foamed particles being melt-adhered to each other to form said wave absorber, wherein said wave absorber comprises the second foamed particles in a proportion of 1–100 parts by weight per 100 parts by weight of the first foamed particles, and (b) a low frequency wave absorber.

2. The combination wave absorber of claim 1, wherein the thermoplastic organic polymer constituting at least one of the first foamed particles and the second foamed particles has an oxygen index of at least 25.

3. The combination wave absorber of claim 2, wherein the thermoplastic organic polymer is a vinylidene chloride resin or polystyrene.

4. The combination wave absorber of claim 1, wherein the conductive layer of the first foamed particles is made from a mixture of at least one member selected from the group consisting of conductive carbon black and conductive graphite, and a latex of a thermoplastic organic polymer.

5. The combination wave absorber of claim 4, wherein the latex of the thermoplastic organic polymer is a latex of a vinylidene chloride resin.

6. The combination wave absorber of claim 4, wherein the thermoplastic organic polymer constituting at least one of the first foamed particles and the second foamed particles has an oxygen index of at least 25.

7. The combination wave absorber of claim 6, wherein the thermoplastic organic polymer is a vinylidene chloride resin or polystyrene.

8. The combination wave absorber of claim 1, wherein the low frequency wave absorber is a sintered ferrite tile.

9. The combination wave absorber of claim 1, wherein said wave absorber comprises the second foamed particles in a proportion of 10–40 parts by weight per 100 parts by weight of the first foamed particles.

10. A method for producing a combination wave absorber, which comprises (a) expansion molding by heating, in a mold, a mixture of prefoamed beads having a conductive surface layer, the beads being made from a thermoplastic organic polymer, wherein the prefoamed beads having a conductive surface layer and the prefoamed beads without a conductive surface layer are melt-adhered to each other to form said wave absorber, and wherein the prefoamed beads without the conductive surface layer are used in a proportion of 1–100 parts by weight per 100 parts by weight of the prefoamed beads having the conductive surface layer and (b) combining said wave absorber with a low frequency wave absorber.

11. The method of claim 10 wherein the prefoamed beads without the conductive surface layer and the prefoamed beads having the conductive surface layer are made from a vinylidene chloride resin or polystyrene.

12. The method of claim 10, wherein the low frequency wave absorber is a sintered ferrite tile.

* * * * *